March 17, 1925.
A. J. ROBERTSON
AUTOMOBILE LOCK
Filed May 14, 1924
1,530,092
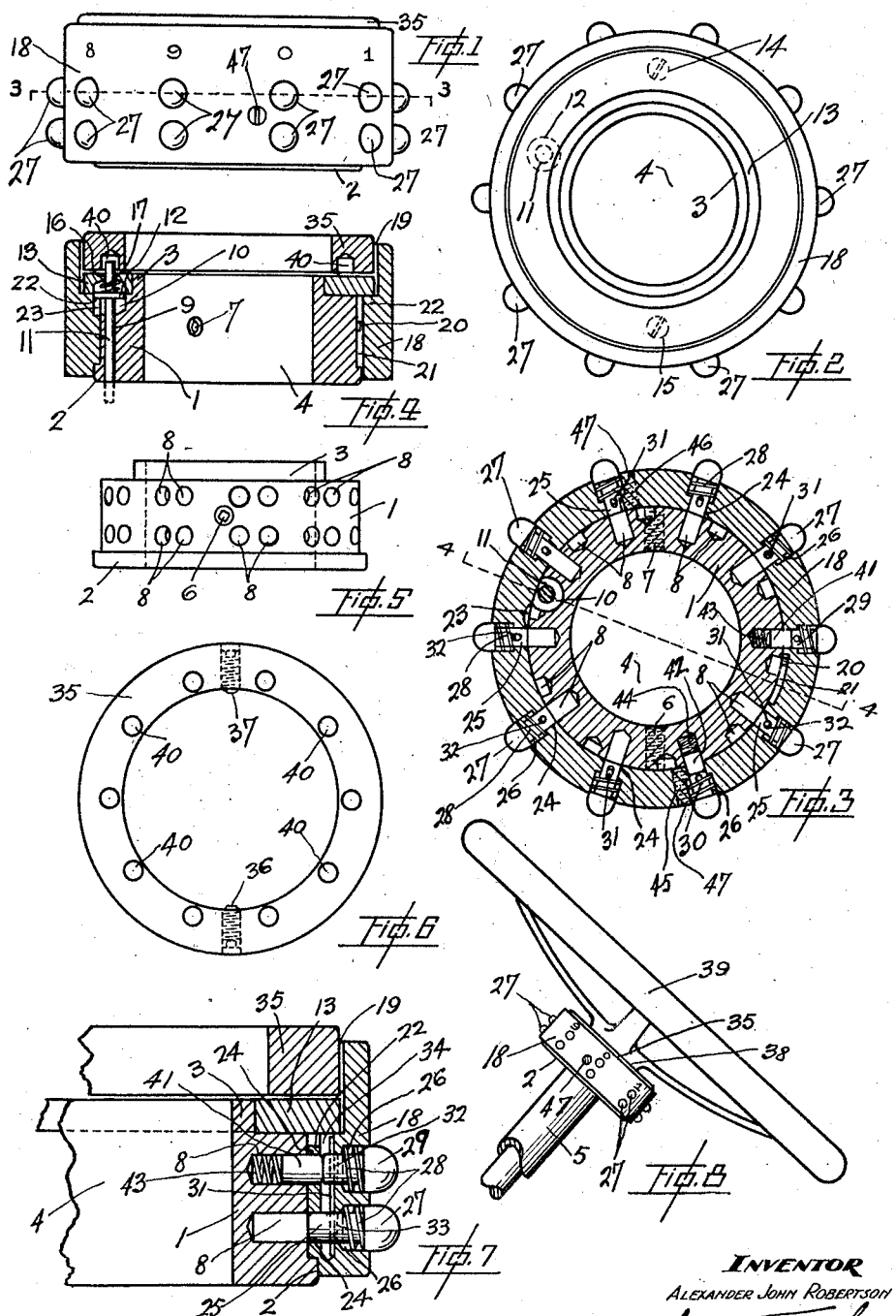
INVENTOR
ALEXANDER JOHN ROBERTSON
By James Taylor
Atty.

Patented Mar. 17, 1925.

1,530,092

UNITED STATES PATENT OFFICE.

ALEXANDER JOHN ROBERTSON, OF SOUTH VANCOUVER, BRITISH COLUMBIA, CANADA.

AUTOMOBILE LOCK.

Application filed May 14, 1924. Serial No. 713,327.

*To all whom it may concern:*

Be it known that I, ALEXANDER JOHN ROBERTSON, a subject of the King of Great Britain, and a resident of the municipality of South Vancouver, in the Province of British Columbia, Canada, have invented certain new and useful Improvements in Automobile Locks, of which the following is a specification.

My invention relates to improvements in automobile locks, and the object of my invention is to devise a combination lock designed to prevent by its use the theft of automobiles which is highly efficient for this purpose and which is simple and inexpensive to construct so that it may be sold at a comparatively low cost and readily installed in place.

I attain this object by the construction illustrated in the accompanying drawings in which—

Fig. 1 is an assembled view of the lock, in side elevation.

Fig. 2 is a plan view of Fig. 1.

Fig. 3 is a sectional plan view taken through the line 3—3 of Fig. 1.

Fig. 4 is a cross sectional view taken through the line 4—4 of Fig. 3.

Fig. 5 is a detail view of the inner collar.

Fig. 6 is a bottom plan view of the steering wheel washer.

Fig. 7 is an enlarged fragmentary view illustrating the button and plunger construction.

Fig. 8 is a view illustrating the practical embodiment of the lock with a steering wheel and column.

Similar figures of reference indicate similar parts throughout the several views.

The device consists of an inner collar 1 the lower face of which is flanged outwardly as at 2 while on its upper face is formed a spigot 3 concentric with the bore 4 of the collar, the diameter of the bore 4 being such as to allow the collar to be fitted on to the steering column 5, indicated in Fig. 8 and to which particular reference will be made hereafter. Set screws 6 and 7 extend through the collar wall on opposite sides the tightening of which when the collar is positioned on the column secures it firmly thereto. Spaced equidistantly around the outer periphery of the collar 1 are sets of recesses 8, in the device illustrated there are ten such sets, arranged in groups of four and in upper and lower pairs, as shown more particularly in Fig. 5, the purpose of which recesses will be described later.

Extending vertically through the collar adjacent one side is a hole 9 counterbored at its upper end as at 10 in Figs. 3 and 4, and the distance of the hole 9 in from the outer periphery of the collar is such that the counterbore 10, which is of the same diameter throughout its depth, cuts through the collar periphery and is incomplete as to its full diameter on its outer side, as shown in Fig. 3. Seated slidably for vertical movement in the hole 9 is a pin 11 provided intermediate its length with a flange 12 which fits slidably the counterbore 10 the length of the pin being such that when in its lowest position with the flange 12 resting towards the bottom of the counterbore 10 the upper extremity of the pin will not project above the upper face of a washer 13 which fits over the collar spigot 2 and is secured to the collar by screws 14 and 15, being provided with a hole 16 into which the upper end of the pin 11 extends, as shown in Fig. 4, while when the pin 11 is in its highest position with the flange 12 raised in the counterbore its upper extremity projects above the said washer 13. In its lowest position the lower end of the pin 11 extends below the lower face of the collar 1, as indicated by the dotted lines in Fig. 4. The hole 16 in the washer 13 is counterbored in its underside and in the counterbore and around the pin 11 above the flange 12 is placed a small coil spring 17, as shown in Fig. 4.

18 indicates an outer collar in the bore of which the inner collar 1 is inserted and the bore of collar 18 is enlarged in diameter to form a recessed upper end 19 the bottom of the recess being flush with the upper face of the collar 1. The washer 13, hereinbefore mentioned, is of greater diameter than that of the collar 1 and of slightly less diameter than the recess 19 diameter so that when secured to the collar 1 it bears on the bottom of the recess 19 and thus maintains the collar 1 against vertical movement in the bore of collar 18 while at the same time permitting free movement in a circumferential direction which is limited by means of a small projection 20 secured in the outer periphery of the collar 1 and seated normally in a slot 21 formed in the inner periphery of the collar 18 the length of which slot governs the circumferential movement of the collar. In other words, the collar 1 is held against vertical movement when assembled with the collar 18 by the washer 13 on its upper end and the flange 2 on its lower end but is freely movable circumferentially; thus if the collar 1 is fixed the collar 18 will be movable circumferentially on the collar 1 and the amount of possible movement will be according to the length of the slot 21, as will hereafter appear.

The bottom of the recess 19 for about half its width is undercut, as at 22, an amount substantially equal to the thickness of the flange 12 of the pin 11, and out of the bore of the collar 18 extending into the undercut and for a depth equal to the depth of the counterbore 10 is cut a portion indicated by the numeral 23, which completes the full diameter of the counterbore 10, from which it will be seen that the counterbore 10 extends partly into the collar 1 and partly into the collar 18, as shown in Figs. 3 and 4.

Spaced equidistantly around the collar 18 are sets of holes 24 arranged in pairs and extending through the collar, there being an upper and a lower hole in each pair, and these holes are pitched the same as the respective vertical pairs of recesses in the collar 1 so that the respective pairs of holes in collar 18 may be brought to register with respective pairs of vertical recesses 8 in the respective groups in the collar 1, as will be more fully hereinafter described. In each hole 24 is slidably fitted a pin, indicated by the numeral 25, and each hole is counterbored as at 26 to permit inward depression of a rounded button head 27 formed on the outer end of each pin 25, a small spring 28 being fitted in the counterbore under the head 27 to maintain the head projecting beyond the outer periphery of the collar 18, as indicated in Figs. 1, 2, and 3. All the pins 25, except those to be used in the combination, in this case indicated by the numerals 29 and 30 in Fig. 3 and referred to later, are maintained normally flush at their inner ends with the inner periphery of the collar 18, and all the pins are held from inadvertent displacement from their assembled positions by means of thin wire-like pins, one of which is shown at 31 in Fig. 7, which pins pass through registering holes 32 and 33 in the respective upper and lower pins 25 of each pair and engage at the same time in vertical holes, one of which is indicated at 34 in Fig. 7, drilled downwardly into the collar 18 from the bottom of its recess 19, these holes and also holes 32 and 33 being larger in diameter than that of the pin 31 to permit the required amount of inward movement of the pins 25, in other words, the pins 31 are slack enough in the holes 32, 33 and 34 to allow such movement. They are retained in the holes by the tension of the springs 28, being also covered therein by the collar 13, which covers the holes 34 when in place.

35 indicates a washer having a diameter slightly less than that of the recess 19 in the collar 18, so that it may engage freely therein, which collar is provided with set screws 36 and 37 by which it may be firmly secured to the boss 38 of the steering wheel 39 while in its underside are spaced holes 40 with any of which the upper end of the pin 11 may engage in the use of the device.

41 and 42 indicate plungers adapted to be seated respectively in two of the recesses 8 of the collar 1 and to be operated by the two button headed pins 29—30, which are made shorter than the other pins 27, the plungers 41 and 42 being spring pressed outwardly by springs 43 and 44, as shown in Figs. 3 and 7. These plungers and short pins are for the purpose of enabling combinations to be formed for controlling the operation of the lock. The respective pairs of button-headed pins are identified by the numerals 1, 2, 3, 4, 5, 6, 7, 8, 9, 0 which are placed above them respectively.

The manner in which the device is used and its operation may be briefly described. The washer 35 is secured to the boss 38 of the steering wheel 39 by means of the set screws 36 and 37 with the holes 40 facing downwardly and the inner and outer collars 1 and 18 with their associated parts as described assembled together are placed on the steering column 5, a slight clearance being allowed between the underside of washer 35 and the upper face of washer 13, the inner collar 1 being firmly secured to the column by its set screws 6 and 7 which are reached to tighten or slacken them through holes 45 and 46 in the outer collar which register with the set screws 6 and 7 when the device is unlocked, but which are out of registration with them when the device is locked, as indicated in Fig. 3, and when the device is securely assembled in place these holes 45 and 46 are closed by set screws screwed into them, as at 47 in Fig. 8. It will now be seen that the entire lock, with the exception of the washer 35, is substantially an integral part of the column 5 and rigid therewith, the washer 35 being, however, rotatable with the steering wheel.

Referring to Fig. 4 it will be seen that if the upper end of pin 11 be projected into any of the holes 40 of the washer 35 it will not be possible to turn the wheel but that turning will only be possible when the pin 11 is clear of the hole 40. The controlling of this projection and depression of the pin 11, which effects the respective locking and unlocking of the device, is governed by the operation of the plungers mentioned by their respective button-headed pins under any combination that may be decided on by the operator, and which as far as one particular combination is concerned and indicated in the drawings may be explained thus.

Suppose the combination in the present case is to be a single 2 and a single 0. Referring to Figs. 1 and 3 it will be noted that the two plungers 41 and 42 are seated respectively in the upper recess of the right hand pair of vertical recesses 8 in the respective groups opposite them and that on account of the two upper button-headed pins 29 and 30 carried by the collar 18 being shorter than the thickness of the collar wall the plungers extend into the holes 24 of the collar 18 in registration with them and consequently the collar 18 cannot be moved around the collar 1. It will be noted further that all the other pins 27 may be pushed inwardly into the recesses 8 opposite them whether they are opposite the right hand vertical recesses 8 of the group or opposite the left hand pair so that in the combination under consideration all the button headed pins, except upper 2 and upper 0, are "dummy" pins and their operation can give no indication of the working of the lock.

When the device is arranged as in Fig. 3 with the plungers 41 and 42 engaging the collar 18 the pin 11 is in its upmost position engaging a hole 40 of the steering wheel washer 35, its flange 12 then resting on the undercut edge 22 of the recess 19 out of registration with the minor part 23 of counterbore 10 which in this position is only partly complete as to its diameter so that it is maintained against dropping from which it will be obvious that the steering wheel is locked and cannot be operated as long as the pin 11 is seated in the hole 40 of the washer 35.

To unlock the wheel the button-headed pins upper 2 and upper 0 are pressed inwardly so that the plungers are moved inwardly free of collar 18 thus enabling the collar 18 to be turned to the left an amount sufficient to bring the minor part of the counterbore 10 in the collar 1 opposite the major part of the counterbore in the collar 18, thus completing the counterbore so that flange 12 of the pin 11 is in full registration with the completed counterbore, allowing the pin to be forced downwardly or depressed clear of the hole 40 by its spring 17, thus permitting free operation of the wheel.

In this position the lower end of the pin 11 projects below the flange 2 of collar 1, as indicated by the dotted lines in Fig. 4. To lock the wheel the pin is pushed upwardly to engage its upper end in a hole 40 of the washer 35 and the collar 18 turned round to the right to carry its undercut edge 22 under the flange 12 of the pin and till the plungers 41 and 42 reengage the holes 24 of the collar, whereupon the device cannot be unlocked with knowledge and operation of the combination consisting of single upper 2 and single upper 0.

Many other combinations may be made depending on the number of plungers and short button-headed pins used. For instance, upper and lower plungers and pins 9 might be used with a single lower plunger 1, in which case the combination would be effected by pressing inwardly the two pins 9 and the lower pin 1.

From the foregoing it will be seen that I have devised a lock for automobiles which, while being simple in construction and operation, is highly practical and useful and in which many changes of the combination may be made with great ease and facility, thus rendering the device of the utmost efficiency for its designed purpose.

What I claim as my invention is:—

1. An automobile lock comprising an inner collar secured to the steering column adjacent the steering wheel boss, a pin carried by said collar adapted for vertical movement to project or retract it into or out of a recess in the said boss; an outer collar movable circumferentially on the inner one adapted when moved in opposite directions respectively to maintain the pin in its projected position or permit its retraction, and combination means controlling the operation of said outer collar.

2. An automobile lock comprising an inner collar secured to the steering column adjacent the steering wheel boss, a pin carried by said collar adapted for vertical movement to project or retract it into or out of a recess in said boss; an outer collar movable circumferentially on the inner one adapted when moved in opposite directions respectively to maintain the pin in its projected position or permit its retraction, combination means controlling the operation of said outer collar, and means for limiting the movement of the outer collar.

3. An automobile lock comprising an inner collar secured to the steering column adjacent the steering wheel boss provided with a plurality of spaced peripheral recesses, a pin carried by said collar adapted for vertical movement to project or retract it into or out of a recess in the said boss, an outer collar movable circumferentially on the inner one adapted when moved in opposite directions respectively to maintain the pin in its projected position or permit its retraction, said collar being provided in its wall with a plurality of spaced holes arranged for registration with an equal number of inner collar recesses, spring-pressed plungers in number determined by the designated combination seated in a corresponding number of inner collar recesses, engaging when the pin is in the projected position the inner ends of a corresponding number of outer collar holes, a corresponding number of spring-pressed push-pins carried in the outer ends of said holes, the inward movement of which also moves inwardly the said plungers, and spring-pressed push-pins occupying the balance of the outer collar holes.

4. An automobile lock comprising an inner collar secured to the steering column adjacent the steering wheel boss provided with a plurality of spaced peripheral recesses, a pin carried by said collar adapted for vertical movement to project or retract it into or out of a recess in said boss, an outer collar movable circumferentially on the inner one, adapted when moved in opposite directions respectively to maintain the pin in its projected position or permit its retraction, said collar being provided in its wall with a plurality of spaced holes arranged for registration with an equal number of inner collar recesses, spring-pressed plungers in number determined by the designated combination, seated in a corresponding number of inner collar recesses, engaging when the pin is projected the inner ends of a corresponding number of outer collar holes, a corresponding number of laterally movable spring-pressed push-pins carried in the outer ends of said holes, the inward movement of which also moves inwardly the said plungers, laterally movable spring-pressed push-pins occupying the balance of the outer collar holes, and withdrawable means for removably retaining said pins in place while permitting their lateral movement.

5. An automobile lock comprising an inner collar secured to the steering column adjacent the steering wheel boss, said collar being provided with a plurality of equidistantly spaced peripheral recesses and a vertical hole counterbored at its upper end extending exteriorly through it adjacent one side, the said hole being spaced so that the counterbore as to its major part only extends in the collar, an outer collar movable circumferentially on the inner one provided in its inner peripheral bore with a cut-out portion completing the said counterbore when registering with the said major part and provided in its wall with a plurality of equidistantly spaced holes arranged for registration with an equal number of inner collar recesses, the bore of said collar being enlarged in diameter at its upper end to form a recess the bottom of which is flush with the upper face of the inner collar and is undercut to form an annular ledge, a pin seated in the inner collar vertical hole adapted for vertical movement to project it into a recess in the steering wheel boss, said pin having a flange intermediate its length adapted to be seated on the said outer collar ledge when in the projected position, and combination controlled means associated with the inner collar recesses and outer collar holes for locking the said outer collar against movement in the projected position of the pin.

6. An automobile lock comprising an inner collar secured to the steering column adjacent the steering wheel boss, said collar being provided with a plurality of equidistantly spaced peripheral recesses and a vertical hole counterbored at its upper end extending exteriorly through it adjacent one side, the said hole being spaced so that the counterbore as to its major part only extends in the collar, an outer collar movable circumferentially on the inner one provided in its inner peripheral bore with a cut-out portion completing the said counterbore when registering with the said major part and provided in its wall with a plurality of equidistantly spaced holes arranged for registration with an equal number of inner collar recesses, the bore of said collar being enlarged in diameter at its upper end to form a recess the bottom of which is flush with the upper face of the inner collar and is undercut to form an annular ledge, a pin seated in the inner collar vertical hole adapted for vertical movement to project it into a recess in the steering wheel boss, said pin having a flange intermediate its length adapted to be seated on the said outer collar ledge when in the projected position, combination controlled means associated with the inner collar recesses and outer collar holes for locking the said outer collar against movement in the projected position of the pin, said means being adapted to be unlocked to permit movement of said collar to bring its cut-out portion to register with the major part of the counterbore to complete the same and withdraw its undercut ledge from under the pin flange, and means for then depressing the pin clear of the steering wheel boss.

7. An automobile lock comprising an inner collar secured to the steering column adjacent the steering wheel boss, said collar being provided with a plurality of equidistantly spaced peripheral recesses and a vertical hole counterbore at its upper end extending exteriorly through it adjacent one side, the said hole being spaced so that the counterbore as to its major part only extends in the collar, an outer collar movable circumferentially on the inner one provided in its inner peripheral bore with a cut-out portion completing the said counterbore when registering with the said major part and provided in its wall with a plurality of equidistantly spaced holes arranged for registration with an equal number of inner collar recesses, the bore of said collar being enlarged in diameter at its upper end to form a recess the bottom of which is flush with the upper face of the inner collar and is undercut to form an annular ledge, a pin seated in the inner collar vertical hole adapted for vertical movement to project it into a recess in the steering wheel boss, said pin having a flange intermediate its length adapted to be seated on the said outer collar ledge when in the projected position, combination controlled means associated with the inner collar recesses and outer collar holes for locking the said outer collar against movement in the projected position of the pin, said means being adapted to be unlocked to permit movement of said collar to bring its cut-out portion to register with the major part of the counterbore to complete the same and withdraw its undercut ledge from under the pin flange, a washer secured to the upper face of the inner collar connecting it and the outer one together provided with a hole through which said pin projects on its upward movement counterbored in its lower end, and a tension spring seated in said counterbore and against which the pin flange is projected.

8. An automobile lock comprising an inner collar secured to the steering column adjacent the steering wheel boss provided with a plurality of spaced peripheral recesses arranged in groups of four in upper and lower pairs, a pin carried by said collar adapted for vertical movement to project or retract it into or out of a recess in the said boss, an outer collar movable circumferentially on the inner one adapted when moved in opposite directions respectively to maintain the pin in its projected position or permit its retraction, said collar being provided in its wall with a plurality of spaced holes arranged in pairs one above the other each pair of holes being spaced to register with either pair of inner collar recesses in the group opposite as the said collar is moved circumferentially in opposite directions, spring pressed push-pins carried in all the said outer collar holes, certain of said pins in number determined by the designated combination being of less length than the length of the holes while the remainder are of substantially the same length as the holes, and spring pressed plungers seated in those inner collar recesses which are opposite the short push-pins when the pin is in its projected position and engageable then in the short push-pin holes.

Dated at Vancouver, B. C., this 7th day of May, 1924.

ALEXANDER JOHN ROBERTSON.